S. C. Wilder.
Seed Planter.
Nº 75613.  Patented Mar. 17, 1868.
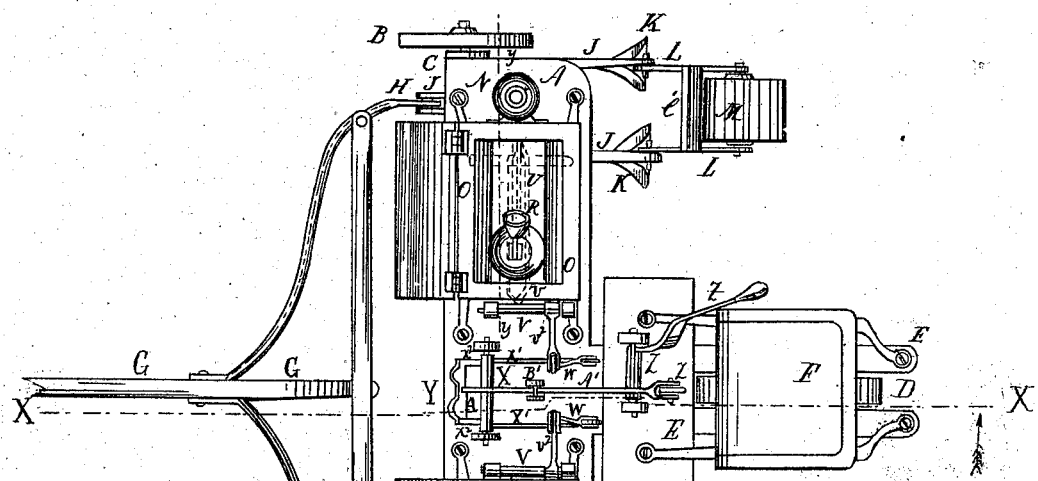
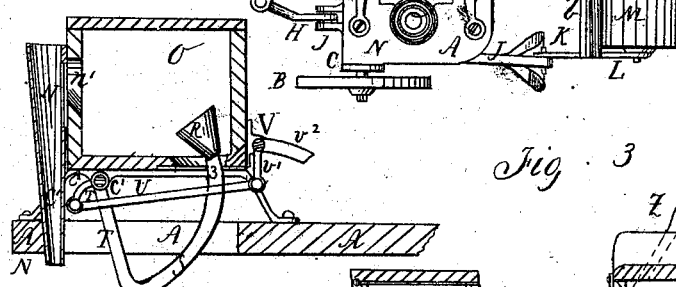
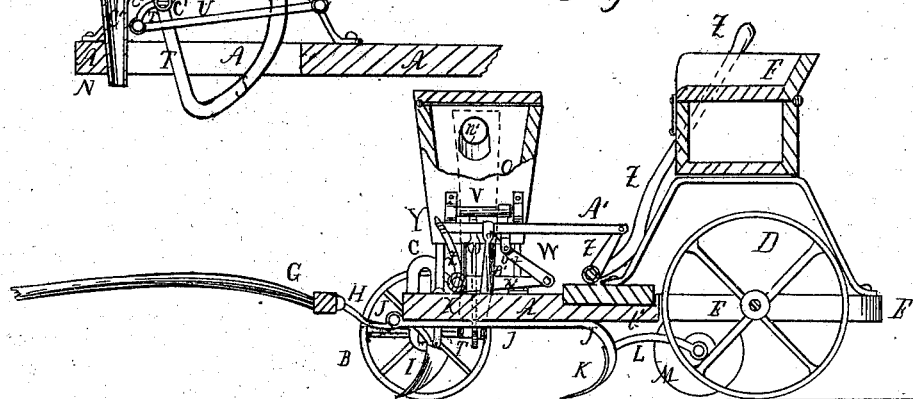
Witnesses  
Theo Tusche  
J. A. Fraser
Inventor  
S. C. Wilder  
Per Munn & Co.  
Attorneys

United States Patent Office.

SILVANUS C. WILDER, OF SARDINIA, OHIO.

*Letters Patent No. 75,613, dated March 17, 1868.*

---

IMPROVEMENT IN SEED-PLANTERS.

---

The Schedule referred to in these Letters Patent and making part of the same.

---

TO ALL WHOM IT MAY CONCERN:

Be it known that I, SILVANUS C. WILDER, of Sardinia, in the county of Brown, and State of Ohio, have invented a new and useful Improvement in Seed-Planter; and I do hereby declare that the following is a full, clear, and exact description thereof, which will enable others skilled in the art to make and use the same, reference being had to the accompanying drawings, forming part of this specification, in which—

Figure 1 is a top view of my improved seed-planter.

Figure 2 is a detail sectional view of the same, taken through the line $y\,y$, fig. 1.

Figure 3 is a vertical cross-section of the same, taken through the line $x\,x$, fig. 1.

Similar letters of reference indicate corresponding parts.

My invention has for its object to furnish an improved seed-planter, in which the dropping-device shall be so constructed and arranged as to be easily operated, and so as to drop the seed promptly and accurately; and it consists in the combination and arrangement of the various parts by means of which the seed is dropped.

A is a slotted bar or beam, to which the various parts of the machine are attached. B are the side wheels, the axles of which are adjustably secured to the vertical slotted bars C attached to the ends of the beam A, so that the ploughs may be adjusted to run at a greater or less depth, as required. D is the rear wheel, the axle of which is attached to the bar or frame E, extending back from the middle part of the slotted beam or frame A. F is the seat, attached to the frame E. G is the tongue. The irons H, by which it is connected to the beam A, extend back, and are bent downward, so as to become standards for the attachment of the marking-ploughs I. J are the standards of the rear or covering-ploughs, which are attached to the under side of the beam A, the forward ends of which form the ears to which the irons H are pivoted, and to the rear ends of which the covering-ploughs K are attached. To the rear parts of the standards J are pivoted frames, L, to which are pivoted the rollers M that press the earth down upon the seed, and mark the rows. The cross-bars $b'$ of the frames L act as scrapers to scrape off the dirt that may adhere to the rollers M. N are the spouts that guide the seed to the ground. The spouts N are attached to the outer ends of the seed-boxes O, and their lower ends extend down through the slots in the beam A to the rear of the marking-ploughs I, so as to guide the seed into the furrows formed by said ploughs. $n'$ are holes formed through the inner side of the upper part of the spouts N, and through the outer ends of the seed-boxes O, for the reception of the cups R that convey the seed from the seed-boxes O to the spouts N. The cups R are made of such a size as to hold the amount of seed required for each hill, and are attached to the upper ends of the curved arms or stems S, which pass through holes in the bottoms of the seed-boxes O, and the lower ends of which are attached to or formed solid with the bent levers T. The bent levers T are pivoted at their angles to the lower side of the bottoms of seed-boxes O, and to their shorter arms are pivoted the outer ends of the double connecting-bars U, which pass along the under side of the boxes O, upon both sides of the levers T and arms or stems S, to serve as guides to said levers and arms as they are operated. To the inner ends of the connecting-bars U are pivoted the ends of the downwardly-projecting arms $v^1$ of the crank or rock-shafts V, which are pivoted to the inner ends of the seed-boxes O, and which have other arms, $v^2$, projecting inward, to the downwardly-curved ends of which are pivoted, with a double-jointed connection, the upper ends of the connecting-bars W. The lower ends of the connecting-bars W are pivoted to the outer ends of the arms $x^1$ of the rock-shaft X. The shaft X is pivoted to the upper side of the beam A, and has upwardly-projecting arms $x^2$ rigidly connected with it, to the upper ends of which is securely attached the treadle-bar Y, so that the device may be operated to drop the seed by the driver with his feet. Z is a lever, pivoted to the frame of the machine, the long arm of which extends up into such a position as to be easily reached and operated by the driver from his seat, or when walking in the rear of the machine. To the end of the short arm of the lever Z is pivoted the rear end of the sliding bar A', the forward end of which is forked, and rests against the treadle-bar Y, so that the device may be operated to drop the seed by operating the lever Z. B' is a post, the lower end of which is securely attached to the beam A, and the upper end of which is slotted to form a support and slide for the bar A' to move back and forth upon when operated. C' is a spring, attached to the lever T and to the boxes O, to bring the parts back to their places as soon as the seed has been dropped.

It should be observed that the machine may be used with one or two horses, and with or without the driver's seat F, as may be desired.

I claim as new, and desire to secure by Letters Patent—

1. The combination of the curved bar or stem S, lever T, spring C', connecting-bars U, rock-shaft and arms V $v^1$ $v^2$, double-jointed connecting-rod W, rock-shaft and arms X $x^1$ $x^2$, and treadle-bar Y, with each other, and with the seed-boxes O and slotted beam A, substantially as herein shown and described, and for the purpose set forth.

2. The combination of the lever Z, sliding bar A', and slide-post or rest B', with each other and with the treadle-bar Y, substantially as herein shown and described, and for the purpose set forth.

SILVANUS C. WILDER.

Witnesses:
ROBT. W. ANDERSON,
S. S. PANGBURN.